United States Patent [19]
Sorenson

[11] 3,726,338
[45] Apr. 10, 1973

[54] CONTROLLED DEFLECTION ROLL WITH CONTROLLED TEMPERATURE

[75] Inventor: Alan R. Sorenson, Orfordville, Wis.

[73] Assignee: Beloit Corporation, Beloit, Wis.

[22] Filed: Dec. 28, 1970

[21] Appl. No.: 101,470

[52] U.S. Cl. ................................ 165/89, 29/116 AD
[51] Int. Cl. ............................................. B21b 13/00
[58] Field of Search ................... 29/116 AD; 165/89, 165/90; 26/1; 219/470; 308/20

[56] References Cited
UNITED STATES PATENTS

| | | | |
|---|---|---|---|
| 3,430,319 | 3/1969 | Skaugen | 29/116 AD |
| 2,448,514 | 9/1948 | Butler | 165/89 |
| 695,041 | 3/1902 | Fues | 165/89 |
| 2,547,086 | 4/1951 | McDermott | 165/89 X |

FOREIGN PATENTS OR APPLICATIONS 50,878  5/1932  Norway ................................ 165/90

Primary Examiner—Manuel A. Antonakas
Attorney—Hill, Sherman, Meroni, Gross & Simpson

[57] ABSTRACT

A controlled deflection roll having a stationary shaft supported at its ends, a roll shell rotatably positioned on the shaft and fluid support means between the shaft and shell transmitting the force of a load on the shell to the shaft, the fluid support means having a lubricating fluid in engagement with the inner surface of the shell, and a heat exchanger supported on the shaft circulating the lubricating fluid and controlling its temperature to control the temperature of the shell with a heat exchange fluid pumped from outside the roll shell to the heat exchanger.

4 Claims, 3 Drawing Figures

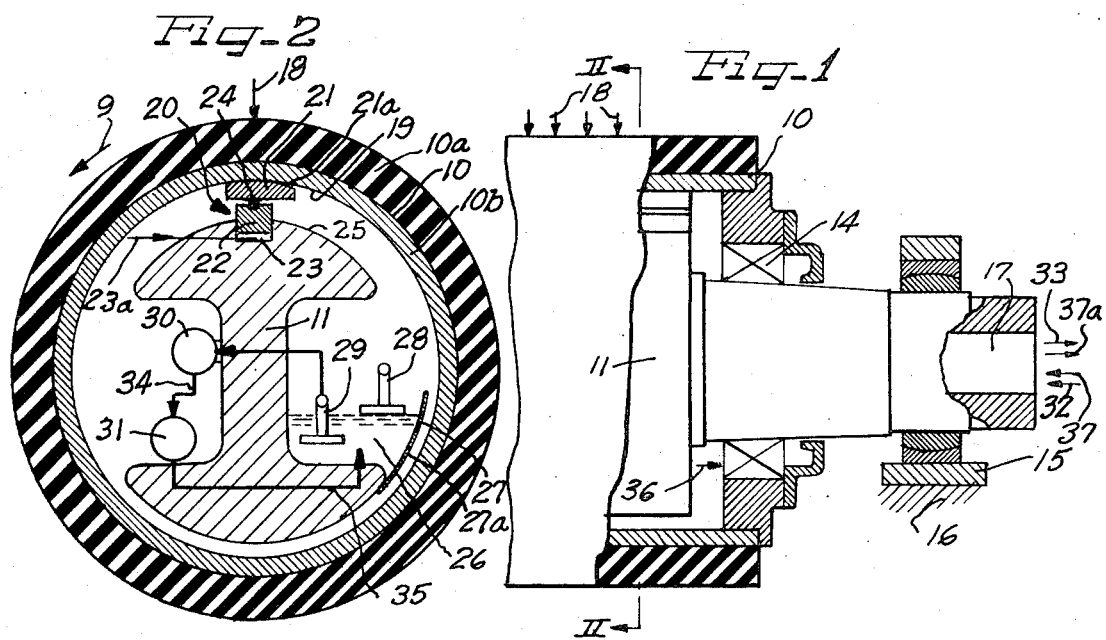

CONTROLLED DEFLECTION ROLL WITH CONTROLLED TEMPERATURE

BACKGROUND OF THE INVENTION

In structures such as paper making machines using rolls, certain locations require that the deflection of the roll be controlled. For example, in a calender or press of a paper making machine, opposing rolls combine to form a paper web receiving nip therebetween which must be maintained at a uniform or controlled pressure along the nip, and influences such as sagging of the rolls due to their weight must be compensated for. This type of roll which enables externally controlled compensation to obtain controlled nip pressure is frequently referred to as a controlled deflection roll.

A controlled deflection roll of the form with which the present invention is concerned employs a rotating roll shell mounted on a stationary shaft which is supported at its ends. End bearings are positioned between the roll shell and the shaft to positively locate the ends of the roll shell, and the working load on the working side of the shall is transmitted to the shaft by fluid support means mounted on the shaft and engaging the inner surface of the roll shell. One form of construction employs a slipper bearing shoe supporting the inner surface of the roll shell on its working side and the shoe is pivotally supported on a piston mounted in a cylinder carried on the shaft and pressurized fluid beneath the piston supports the shoe and the shoe extends along the length of the roll shell so that it is uniformly supported by the fluid along its length. Obviously, the shaft is positioned with sufficient clearance so that it can bend relative to the roll shell and thereby the roll shell can extend substantially straight while the shaft bends as it carries the load, supported at its ends. One particular advantage of this form of construction, which is shown and described in U.S. Pats. issued to E. J. Justus, Nos. 3,119,324 and 3,276,102 is that a substantial quantity of lubrication fluid passes between the slipper bearing and the roll shell, and this fluid maintains the roll shell at a uniform temperature along the length of the shell.

Another form of controlled deflection roll which has been used embodies a roll shell and a stationary shaft therein with the load on the roll shell being transferred to the shaft through a body of liquid which is confined between the shaft and shell by circumferentially spaced seals that are mounted on the shaft and slide against the surface of the shell. An example of this type of structure is shown in British Pat. publication No. 641,466, FIG. 1.

In certain machine operations a substantial amount of heat is either generated or transferred to the roll shell. For example, in a paper making machine where the roll shell is rubber covered, large amounts of heat are generated. While some of the heat is radiated to the surrounding air or is removed by shower water, the rest must be removed internally of the shell by the fluid which is in engagement with the internal surface of the roll shell. As speeds of the machines increase and working nip pressures increase, the amount of heat generated is such that it becomes difficult to circulate a sufficient amount of heat transfer fluid within the shell to remove the heat which is generated and to maintain the roll at the desired temperature. The present invention contemplates providing an improved means for more effectively carrying away of heat from the roll shell through the fluid within the shell to enable high speed and high pressure operations and the generation of large amounts of heat. For this purpose a heat exchanger is provided, mounted on the shaft, making it possible to handle the fluid within the shell in quantities which are optimum for lubrication and to maintain it at a cool temperature sufficient to positively and adequately cool the roll shell, utilizing a separate heat exchanger fluid that is better suited to be used solely for the removal of heat and which compared with the lubricating fluid, can be of a lower viscosity, of a higher specific heat, and be handled in quantities and temperatures suited exclusively to the optimum removal of heat.

It is accordingly an object of the present invention to provide an improved controlled deflection roll structure wherein it is possible to positively control the temperature of the roll shell and to transfer higher quantities of heat between the roll shell and internal fluid in contact therewith than heretofore possible.

A further object of the invention is to provide an improved controlled deflection roll structure with lubrication fluid circulation that obtains advantages heretofore unavailable and which obtains uniform and controlled roll temperature.

Other objects and advantages will become more apparent with the teaching of the principles of the invention in connection with the disclosure of the preferred embodiments thereof in the specification, claims and drawings, in which:

DESCRIPTION OF THE DRAWINGS

FIG. 1 is a fragmentary sectional view of one end of a controlled deflection roll;

FIG. 2 is a vertical sectional view taken substantially along II—II of FIG. 1 showing schematically the structure for lubrication and controlling the temperature of the roll shell in accordance with the principles of the present invention; and FIG. 3 is a diagrammatic view of the fluid handling arrangement employed in the structure of FIG. 2.

DESCRIPTION OF THE PREFERRED EMBODIMENTS

As shown in FIGS. 1 and 2, a roll shell 10 is rotatably mounted on a stationary shaft 11 which is adapted to be supported at its ends. For locating the ends of the roll shell 10 with respect to the shaft, end bearings 14 are provided between the ends of the roll shell 10 and the shaft 11.

To support the end of the shaft, a universal support 15 is supported on a frame or mount 16 in a manner to permit bending of the shaft as the load from the roll shell is transmitted to the shaft. The load on the shell is represented by arrowed lines 18 which represent a load such as that from a nip formed with a mating roll. The roll shell is shown with an inner metal portion 10b and an outer rubber covering 10a, although in many forms the shell is formed of metal alone. The rubber covering 10a is shown since, in this form, considerable heat is generated which must be removed to prevent destruction of the rubber. In commonly used paper machine rolls this metal shell will be from 1½ inches to 2 inches thick and the rubber covering from ½ inch to ¾ inch thick, although a thicker rubber covering is shown in the drawings, by way of example only, to emphasize the heating problems encountered with rubber covering. It will be appreciated that while in the preferred arrangement structure is employed to carry away heat from the roll to maintain it at uniform temperature, the principles of the invention may be used to transmit heat to the roll by a fluid. In the arrangement to be described, a heat exchanger will be discussed which removes heat from heat transmitting fluid in contact with the inner surface of the roll shell, but in alternative forms a heat transmitter may be employed which heats the fluid and thereby heats the roll shell. This operation may be employed in machines wherein the roll shell must be heated and wherein it may be used to transmit heat to the web or material being processed through the nip.

For obtaining uniform or controlled pressure along the nip line where the load 18 is encountered, the forces on the roll shell are transmitted to the shaft through a fluid support means shown generally at 20. In a preferred form the fluid support means includes a slipper bearing shoe 21 in close running relation with the finished smooth inner surface 19 of the roll shell. In the direction of rotation of the roll shell indicated by the arrowed line 9, lubricating and heat transmitting fluid, which is preferably in the form of oil, is carried up on the surface of the roll shell and carried beneath the tapered leading edge 21a of the shoe 21 to form a lubricating film of oil between the shoe and surface 19. This lubricating film is continually carried through between the surfaces and receives heat from the roll shell. As an excess amount of oil is carried up on the inner surface 19 of the roll shell, a substantial amount builds up at the leading edge 21a of the shoe and flows down over the top of the shaft and drips downwardly on the shaft edge 25 into a sump 26. This sump is formed between the shaft 11 and a pan wall 27. The pan wall is provided with a series of orifices 27a below the level of the lubricant in the sump 26 so that a continuous flow of oil flows out through the openings 27a onto the inner surface 19 of the roll shell and it is covered with a good layer oil which is carried up to the leading edge 21a of the shoe. Heat from the shell is transmitted to the oil during its travel along the inner surface thereof and as the excess oil flows down off the leading edge 21a onto the surface 25 of the shaft 11, it flows down into the sump 26. The oil in the sump is cooled by being pumped through a heat exchanger as will be later described.

The fluid support means between the shell 10 and the shaft 11 includes the slipper shoe 21 which is supported on a piston 22 carried in a cylinder or chamber 23 supplied with pressurized oil through a pump, not shown, delivering to a line 23a. The shoe is pivotally supported about an axis parallel to the roll shell on a roll pin 24 supported on top of the piston 22 and engaging in a recess in the shoe 21.

For cooling the oil in the sump 26 and thus removing its heat which has been received during its period of engagement with the inner surface 19 of the roll shell, the oil is pumped through a sump intake 29 by a pump 30 and delivered through a line 34 to a heat exchanger 31, as shown both in FIGS. 2 and 3. After the oil is cooled, it is delivered through a heat exchanger discharge line 35 back to the sump.

For removing the heat in the heat exchanger, a heat exchange fluid is delivered to the heat exchanger by a pump and delivery line 32 and the fluid is discharged through a line 33. These lines pass to the interior of the roll shell through the cored center of the shaft 11, as shown in FIG. 1. With this arrangement a lubricating and heat transfer fluid may be employed in the sump 26 which is optimum for providing the lubricating film between the shoe 21 and inner surface 19 of the roll shell, and which is optimum for the removal of heat from the inner surface of the roll shell. Yet, a heat exchange fluid may be employed through the lines 32 and 33 which has optimum properties for removal of heat. Because of the large quantity of heat which needs to be removed, the heat exchange fluid can be of a lower viscosity than the lubricating oil and can have a higher specific heat. Further, it can be pumped at a higher velocity and in greater quantities without the problems of frothing and foaming and the condition of the fluid need be of no concern since they do not affect the lubrication and operation of the controlled deflection roll itself. Further, a pump 32a for the heat exchange fluid can be used which delivers an optimum quantity of heat exchange fluid, and the output of the pump can be controlled to meet the need for heat removal from the lubricating oil. The pump for the heat exchange fluid may be provided with a higher capacity than the lubrication fluid pump 30. For example, a heat exchange liquid may be used at an extremely low temperature below that which would be either permitted or possible with a higher viscosity lubricating oil. Thus, a much greater flexibility and capacity is obtained for cooling than heretofore where either no circulation was present or when the lubricating oil itself was pumped outside of the roll shell and recirculated in a single circulating circuit. It will be apparent that suitable mounting brackets and openings for the conduits and pumps will be provided on the shaft 11 and these need not be described in detail.

A unique arrangement is provided for driving the pump 30 for the heat exchanger 31. The pump 30 is driven by a hydraulic motor 38 as illustrated in FIG. 3. The hydraulic motor is operated by the same lubricating oil as is in the sump 26. For this purpose the hydraulic motor 38 is connected to drive the pump 30. The hydraulic motor is provided with pressurized oil by a drive pump 40 which is located outside of the roll shell. The drive pump receives oil from a supply chamber 40a. This chamber 40a is kept replenished by a pump 42 connected to an intake 28 which functions to maintain the level illustrated in FIG. 2 in the sump 26. In some instances the intake 28 may be connected directly to the pump 40. By maintaining this level the lubricating oil intake 29 is maintained submerged. The pump 40 forces the oil through a filter 41 to the hydraulic motor 38, and the discharge from the motor is uniquely utilized to lubricate the end bearings through the line 36 in the manner shown in FIG. 1. The excess oil from these end bearings flows down into the roll shell to additionally coat the inner surface 19.

While the heat exchanger has been described as operating with a cooling medium delivered through the line 32, in circumstances where the roll shell must be heated, a heating medium will be employed.

While the foregoing describes the preferred arrangement of a controlled deflection roll utilizing a slipper bearing, in the arrangement wherein the controlled deflection roll utilizes a pressure chamber of oil in direct contact with the inner surface of the roll shell, such as British Pat. publication No. 641,466, the pressurized oil which is delivered to the pressure chamber will be recirculated through a heat exchanger mounted on the shaft. The heat exchanger will be supplied with oil withdrawn from internally of the roll shell which leaks past the seals. Where increased cooling is necessary, oil can be withdrawn directly from the pressure chamber and the discharge from the heat exchanger will be forced directly into the pressure chamber. By maintaining a predetermined circulation of oil and controlled cooling, the temperature of the roll shell can be controlled. The remaining portion of the structure will be the same as shown in the drawings with the heat exchanger on the shaft being supplied by a pump which is driven by a hydraulic motor and the discharge from the hydraulic motor being used to lubricate the end bearings.

A thermal regulator may be employed when measuring the temperature of the oil within the sump 26 and connected to control the temperature and flow of heat exchange fluid delivered by the pump 32a and/or to control the temperature of the heat exchange fluid. Alternatively, the temperature measuring device may be applied directly to the roll shell to maintain its temperature. Operation of the lubricating oil circulating pump 30 may also be regulated, but this is operated with sufficient capacity to operate the hydraulic motor.

Operation of the controlled deflection roll has been improved since the lubricating oil flow arrangement may be optimized for factors of roll operation other than heat transfer, and heat removal may be completly accommodated by the heat exchanger which is located within the roll shell. Further, the combined pump and hydraulic motor coact in a manner so that fluid driving the motor is utilized to lubricate the end bearings and this lubricant in its total path of circulation is maintained at a proper operating temperature, and the lubricant serves the dual function of operating the motor for the heat exchanger pump as well as lubricating the end bearings.

Thus, it will be seen that I have provided an improved structure which meets the objectives and advantages above set forth and obtains improved operation of controlled deflection rolls extending the already useful range to newer limits and making them available for additional and more extensive processes and machine use.

I claim:

1. A controlled deflection roll comprising in combination,
    a stationary shaft means adapted to be supported at its ends,
    a roll shell rotatably positioned surrounding the shaft means having an outer surface for engaging an external load on a working side of the shell and having a finished inner surface,
    bearing means between the shaft and each end of the roll shell locating the shell ends relative to the shaft,
    fluid support means between the shaft and the shell transmitting the force from said load on the working side of the shell to the shaft so that the shell is substantially uniformly supported along its length and having fluid in heat transmitting relationship with the internal surface of the roll shell,
    a heat exchanger means located within the roll shell connected to said supply means for controlling the temperature of said fluid so that the temperature of the outer surface of the roll shell is controlled,
        said heat exchanger being supplied with a heat exchange fluid for carrying away the heat from said heat transmitting fluid with the heat exchange fluid having a lower viscosity than said heat transmitting fluid,
    a first pumping means for said heat transmitting fluid, and a second pumping means for said heat exchange fluid with the second pumping means having higher capacity than said first pumping means for a higher flow of heat exchange fluid.

2. A controlled deflection roll comprising in combination,
    a stationary shaft means adapted to be supported at its ends,
    a roll shell rotatably positioned surrounding the shaft means with an outer surface for engaging an external load on a working side of the shell and with a finished inner surface,
    bearing means between the shaft and each end of the roll shell positively locating the shell ends relative to the shaft,
    fluid support means between the shaft and the shell transmitting the force from said external load on the shell to the shaft so that the shell is substantially uniformly supported along its length, said fluid support means including,
    a slipper bearing shoe means supportingly positioned along the length of the shell facing the inner surface of said roll shell,
    a piston and cylinder means mounted on the shaft means and supporting said shoe means about a pivotal axis parallel to the axis of the roll shell,
    means supplying support fluid under pressure to the piston and cylinder means so that the working load on the shell is transferred to the shaft,
    supply means for supplying a lubricating and heat transfer fluid to the inner surface of the roll shell for forming a lubricating film between the shoe means and inner surface of the roll shell,
    a heat exchanger connected to said supply means for controlling the temperature of the heat transfer fluid so that the temperature of the outer surface of the roll shell is controlled,
        said heat exchanger being supported on the shaft within the shell, said heat exchanger including a heat exchange fluid supply means externally of the shaft with connecting lines leading along the shaft to said heat exchanger,
    a first pump for said supply means,
    a second pump for the heat exchange fluid to control the temperature of said heat transfer fluid,
    an open sump supported on the shaft positioned for collecting excess heat transfer fluid which does not pass between the shoe means and the inner surface of the shell, and means for maintaining a constant level of fluid in the sump, said first pump positioned to receive heat transfer fluid from said sump for pumping it to said heat exchanger.

3. A controlled deflection roll comprising in combination, a stationary shaft means adapted to be supported at its ends, a roll shell rotatably positioned surrounding the shaft means having an outer surface for engaging an external load on a working side of the shell and having a finished inner surface, bearing means between the shaft and each end of the roll shell locating the shell ends relative to the shaft, fluid support means between the shaft and the shell transmitting the force from said load on the working side of the shell to the shaft so that the shell is substantially uniformly supported along its length and having fluid in heat transmitting relationship with the internal surface of the roll shell, supply means supplying said heat transmitting fluid to the inner surface of the roll shell, and a heat exchanger means located within the roll shell connected to said supply means for controlling the temperature of said fluid so that the temperature of the outer surface of the roll shell is controlled, said heat exchanger being supported on the shaft within said roll shell, said supply means including a hydraulic pump driven by a hydraulic motor and the discharge from the motor being delivered to the end bearings, said supply means transferring said heat transfer fluid to said bearing means with the fluid subsequently flowing to the inner surface of the roll shell.

4. A controlled deflection roll comprising in combination, a stationary shaft means adapted to be supported at its ends, a roll shell rotatably positioned surrounding the shaft means having an outer surface for engaging an external load on a working side of the shell and having a finished inner surface, bearing means between the shaft and each end of the roll shell locating the shell ends relative to the shaft, fluid support means between the shaft and shell transmitting the force from said load on the working side of the shell to the shaft so that the shell is substantially uniformly supported along its length and having fluid in heat transmitting relationship with the internal surface of the roll shell, supply means supplying said heat transmitting fluid to the inner surface of the roll shell, and a heat exchanger means located within the roll shell connected to said supply means for controlling the temperature of said fluid so that the temperature of the outer surface of the roll shell is controlled, said heat exchanger being supplied with a heat exchange fluid for carrying away the heat from said heat transmitting fluid with the heat exchange fluid having a lower viscosity than said heat transmitting fluid, said heat exchange fluid having a higher specific heat than said heat transmitting fluid.

* * * * *